US011071189B2

(12) United States Patent
Sulzbach

(10) Patent No.: US 11,071,189 B2
(45) Date of Patent: Jul. 20, 2021

(54) CONDUCTIVE METAL SCREEN FOR LIGHTNING STRIKE PROTECTION AND A METHOD FOR FABRICATING SAME

(71) Applicant: Astroseal Products Mfg. Corporation, Chester, CT (US)

(72) Inventor: John Sulzbach, Killingworth, CT (US)

(73) Assignee: Astroseal Products Mfg. Corporation, Chester, CT (US)

( * ) Notice: Subject to any disclaimer, the term of this patent is extended or adjusted under 35 U.S.C. 154(b) by 562 days.

(21) Appl. No.: 15/865,737

(22) Filed: Jan. 9, 2018

(65) Prior Publication Data

US 2019/0037675 A1     Jan. 31, 2019

Related U.S. Application Data

(60) Provisional application No. 62/444,136, filed on Jan. 9, 2017.

(51) Int. Cl.
*H05F 3/00*     (2006.01)
*B64D 45/02*    (2006.01)

(52) U.S. Cl.
CPC ............... *H05F 3/00* (2013.01); *B64D 45/02* (2013.01)

(58) Field of Classification Search
CPC .................................. B64D 45/02; H05F 3/00
See application file for complete search history.

(56) References Cited

U.S. PATENT DOCUMENTS

2013/0271891 A1\* 10/2013 Shimp ...................... H02H 1/04
                                                            361/220
2018/0050817 A1\*  2/2018 Le ........................... B64D 45/02

\* cited by examiner

*Primary Examiner* — Jared Fureman
*Assistant Examiner* — Christopher J Clark
(74) *Attorney, Agent, or Firm* — Steven M. McHugh

(57) ABSTRACT

A Conductive Lightning Protective Screen (CLPS) and a method for fabricating the CLPS is provided, wherein the CLPS includes a screen structure having a structure thickness of between about 0.002 inches and about 0.006 inches, wherein the screen structure includes a plurality of openings. Each of the plurality of openings are defined by a plurality of sidewalls each having a sidewall width of between about 0.005 inches and 0.009 inches, wherein each of the plurality of openings shares at least one sidewall of the plurality of sidewalls of an adjacent opening. Moreover, each of the plurality of openings includes an opening width and an opening length of substantially equal size, and wherein each of the plurality of openings include a plurality of substantially equal internal angles.

15 Claims, 8 Drawing Sheets

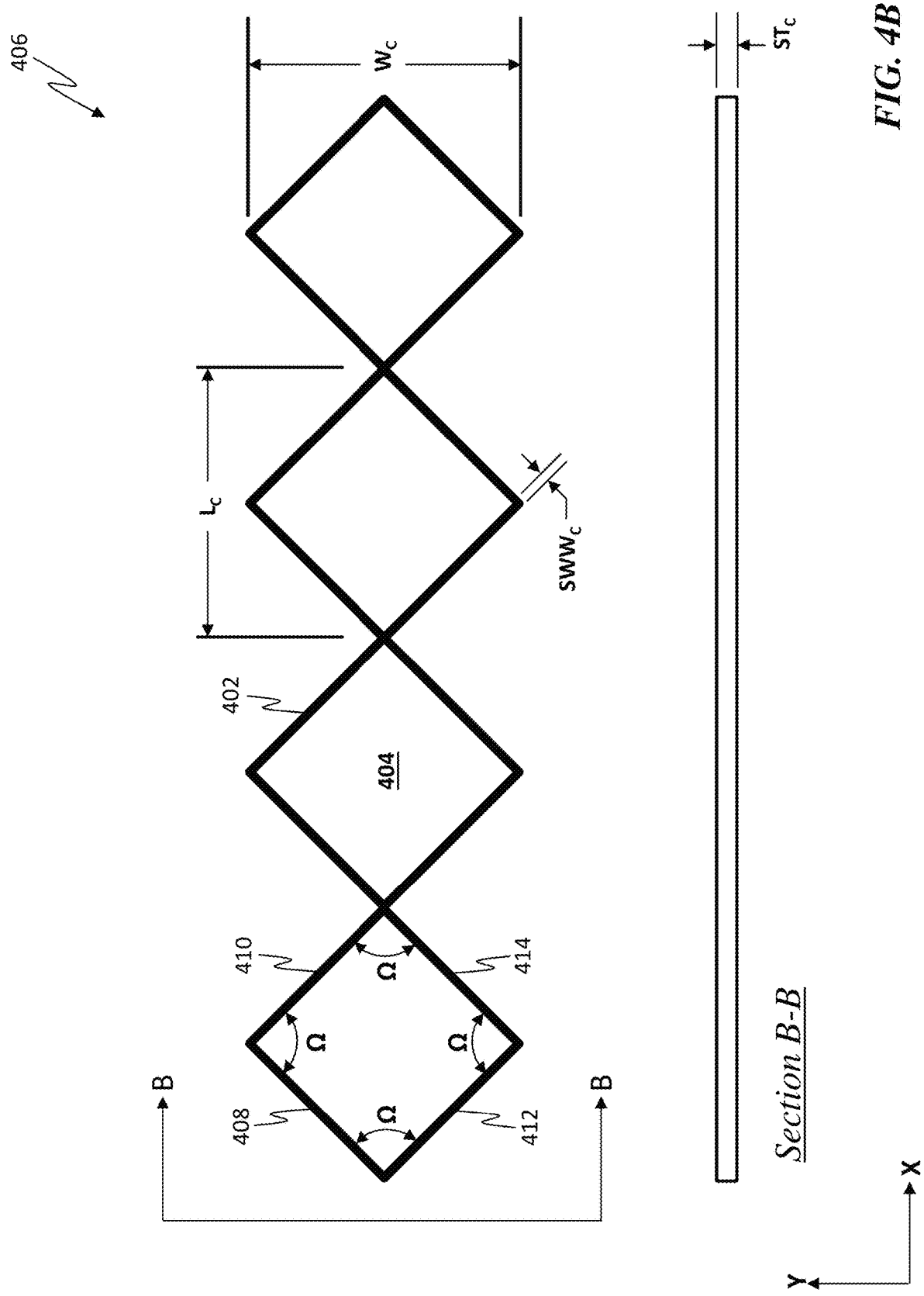

CONDUCTIVE METAL SCREEN FOR LIGHTNING STRIKE PROTECTION AND A METHOD FOR FABRICATING SAME

CROSS REFERENCE TO RELATED APPLICATIONS

This application is related to and claims the benefit of the filing date of U.S. Provisional Patent Application Ser. No. 62/444,136 filed Jan. 9, 2017, the contents of which are incorporated herein by reference in its entirety.

FIELD OF THE INVENTION

The present invention relates generally to an expanded metal screen for use in lightning strike protection and more particularly to an aluminum or copper screen that is expanded into a square pattern that creates a screen with equal properties in X and Y directions.

BACKGROUND OF THE INVENTION

Lightning strikes are very common and typically may contain between 100 million and 1 billion volts of electricity with a current of up to 30,000 amperes (kA). When lightning strikes an object, it most cases it can be expected that the object will sustain a large amount of damage. This is particularly undesirable when lightning strikes an aircraft, which statistically can occur once every 1,000 to 3,000 flight hours on average. This amount of energy can have a direct impact on the structural and operational integrity of the aircraft and if the energy of the strike is allowed to impact aircraft components, the aircraft may become damaged and/or crash. For example, an aircraft typically flies farther than its own length in the time it takes a lightning strike to begin and end. This can result in multiple burn areas or other damage that could have a direct effect on a plane's structural integrity. Additionally, the indirect effects of the strike may include transient voltage strikes which can damage radio equipment, avionics and other electrically operated mechanisms, such as fuel valves. In fact, fatal accidents have occurred when current has arced around metal fasteners and ignited fuel vapors.

Accordingly, aircraft designers try to provide a continuous conductive path of low resistance over the aircraft exterior to 'direct' the energy from the lightning strike away from area's where lightning is most likely to attach, such as the radome (or nose), wingtips, nacelles and/or empennage. This 'energy redirection' is typically accomplished (at least partially) by surrounding the aircraft with a metallic material which has a relatively low resistance. Typically, an expanded foil mesh/screen (such aluminum, copper, etc.) which has a relatively low resistance is used to direct the energy of a lightning strike away from the composite materials and other areas of concern on an aircraft.

Referring to FIG. 1A, a conventional lightning protection expanded foil screen 100 in accordance with the prior art is shown and includes a screen structure 102 which defines a plurality of openings 104 that are formed in a generally rhombus or diamond shaped pattern having interior angles $\beta$, $\delta$, that are unequal. Referring to FIG. 1B, a portion 106 of the screen structure 102 is shown illustrating one opening 104, wherein the screen structure 102 around the opening 104 includes four (4) sides which define the opening 104. The four (4) sides include a first side 108, a second side 110, a third side 112 and a fourth side 114, wherein the first side 108 and the second side 110 are separated by the angle $\beta$, the third side 112 and the fourth side 114 are separated by the angle $\beta$, the first side 108 and the third side 112 are separated by the angle $\delta$ and the second side 110 and the fourth side 114 are separated by the angle $\delta$, wherein the angle $\beta$ is approximately 137°±2° and the angle $\delta$ is approximately 43°±2°. As such, angle $\beta$ and angle $\delta$ are unequal. Moreover, the first side 108, second side 110, third side 112 and fourth side 114 are approximately 0.006±0.001 inches wide and define an opening 104 that includes an opening length $L_{P4}$ that is approximately 0.095±0.007 inches and an opening width $W_{P4}$ that is approximately 0.037±0.005 inches. This shape, which was derived from expanded metal used in the battery industry, has proved to be popular over time due to its ease of manufacture.

Unfortunately however, because these traditional screens 100 having unequal interior angles $\beta$, $\delta$ they tend to produce a higher percentage of conductivity in one direction (i.e. the X or lengthwise direction) relative to the other direction (i.e. the Y or widthwise direction). This is undesirable because it makes it more difficult to evenly 'direct' the energy from the lightning strike away from where lightning is most likely to attach and cause damage to flight critical and non-critical components.

SUMMARY OF THE INVENTION

A Conductive Lightning Protective Screen (CLPS) is provided and includes a screen structure, wherein the screen structure includes a plurality of openings, wherein each of the plurality of openings are defined by a plurality of sidewalls and wherein each of the plurality of openings shares at least one sidewall of the plurality of sidewalls of an adjacent opening. Moreover, each of the plurality of openings include an opening width and an opening length of substantially equal size, and wherein each of the plurality of openings include a plurality of substantially equal internal angles.

A Conductive Lightning Protective Screen (CLPS) is provided and includes a screen structure having a structure thickness of between about 0.002 inches and about 0.006 inches, wherein the screen structure includes a plurality of openings. Each of the plurality of openings are defined by a plurality of sidewalls each having a sidewall width of between about 0.005 inches and 0.009 inches, wherein each of the plurality of openings shares at least one sidewall of the plurality of sidewalls of an adjacent opening. Moreover, each of the plurality of openings includes an opening width and an opening length of substantially equal size, and wherein each of the plurality of openings include a plurality of substantially equal internal angles.

A method for fabricating a Conductive Lightning Strike Protective Screen is provided, wherein the method includes expanding a material into a nonwoven screen, processing the nonwoven screen to remove grease and other surface contaminants and flattening the nonwoven screen to a screen thickness of between about 0.002 inches and about 0.006 inches to create a flattened nonwoven screen. The method further includes annealing the flattened nonwoven screen to create a foil mesh, bathing the foil mesh within a coating solution for approximately 30 seconds to create a coated foil mesh and curing the coated foil mesh for approximately 18 hours to create the Conductive Lightning Strike Protection Screen, wherein the Conductive Lightning Strike Protection Screen defines a plurality of openings having four (4) substantially equal internal angles.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 4B shows a section of the Conductive Copper Lightning Protective Screen of FIG. 4A.

DETAILED DESCRIPTION OF THE INVENTION

Figure 1A:
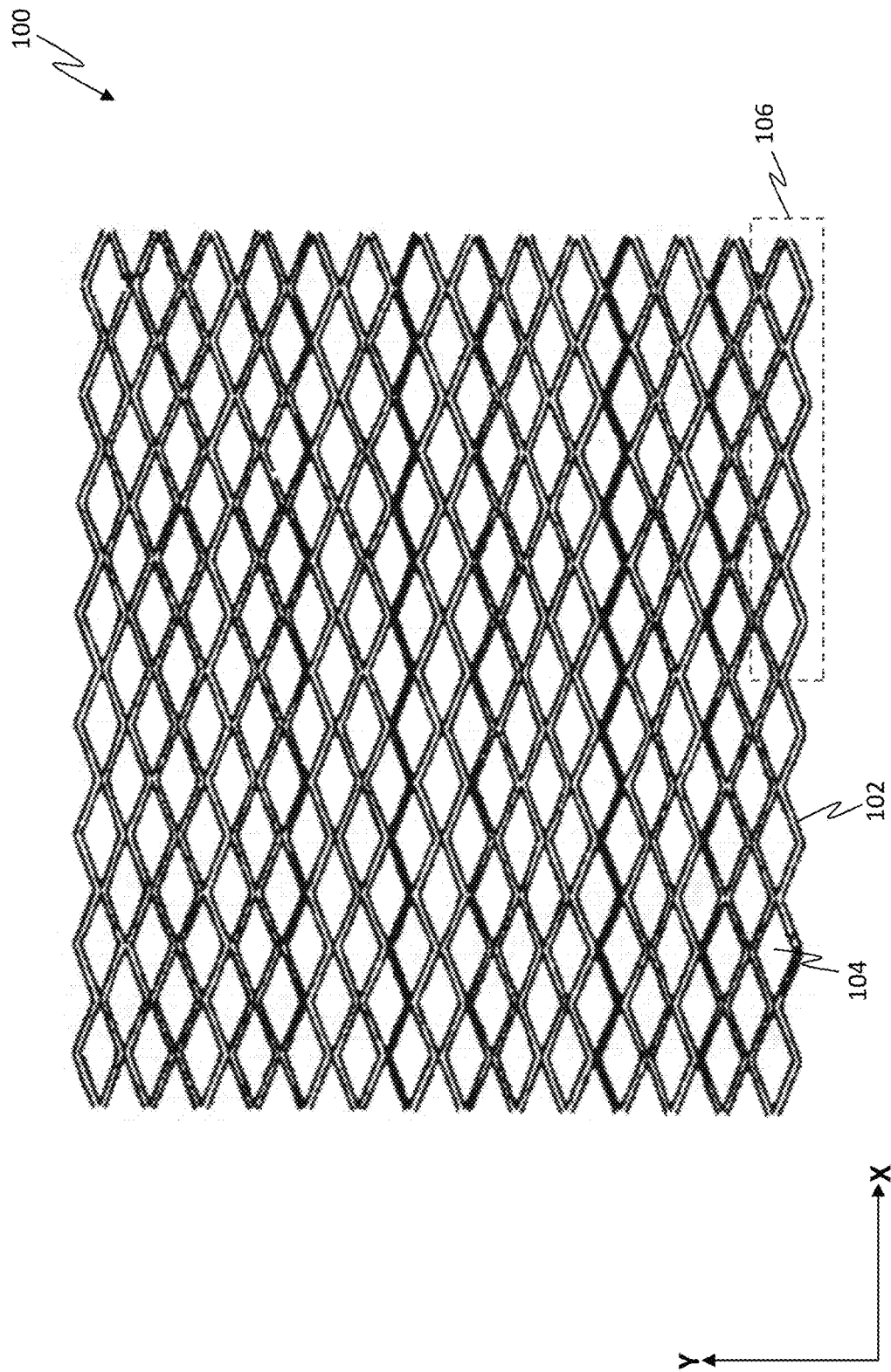
FIG. 1A shows a front view of a conventional lightning protection expanded foil screen, in accordance with the prior art.
Figure 1B:
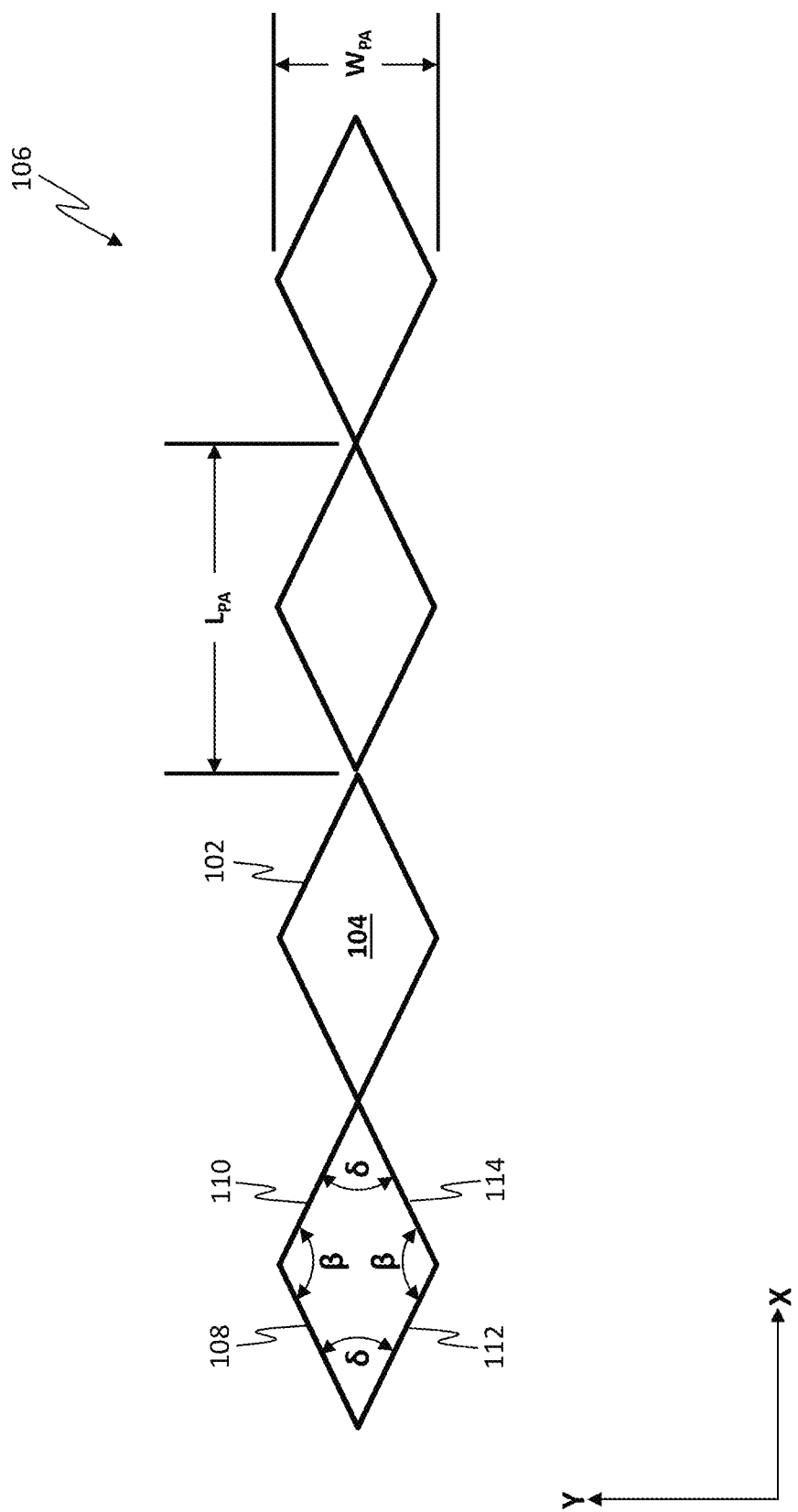
FIG. 1B shows a section of the conventional lightning protection expanded foil screen of FIG. 1.
Figure 2A:
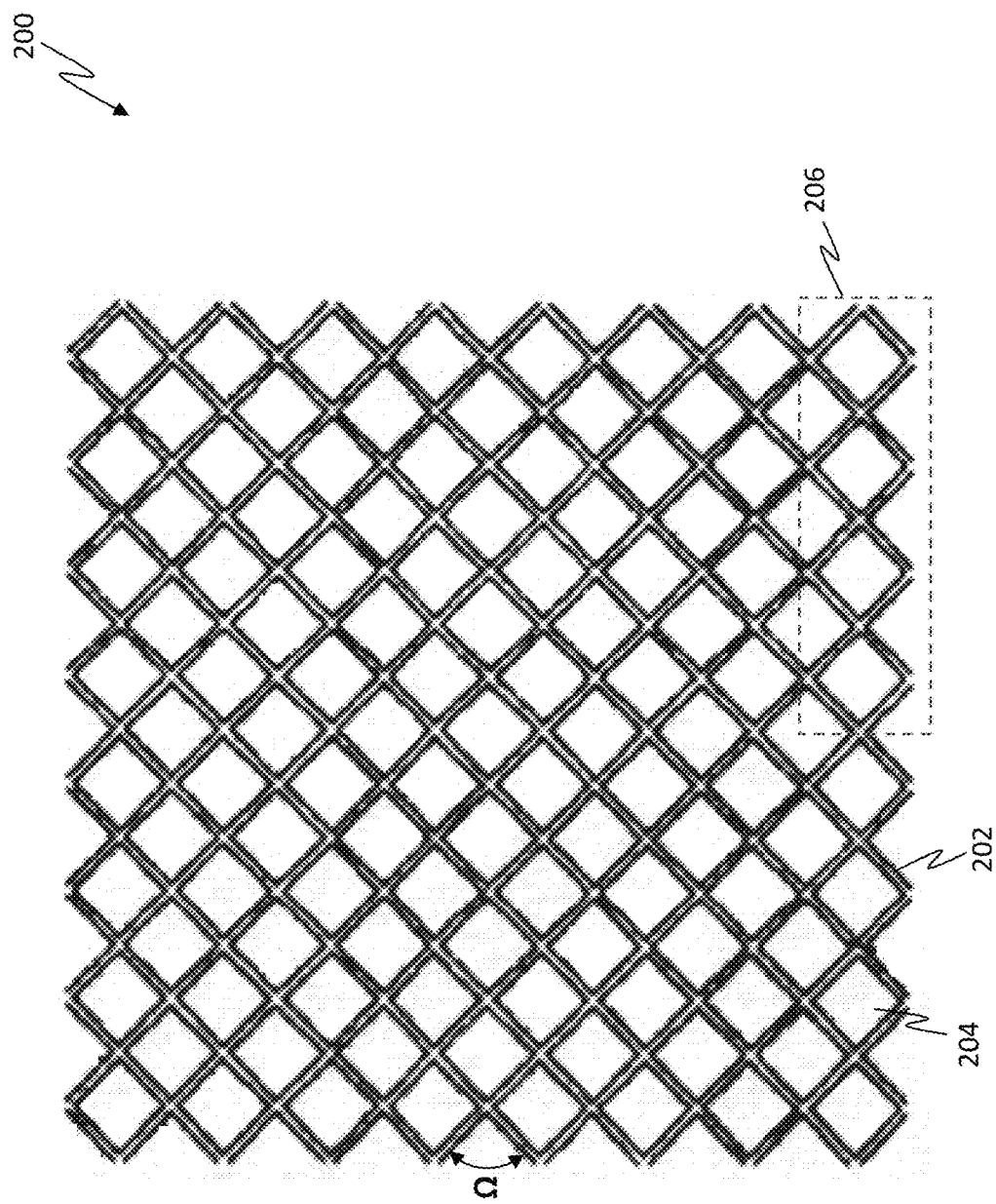
FIG. 2A shows a front view of a Conductive Aluminum Lightning Protective Screen, in accordance with one embodiment of the invention.
Figure 2B:
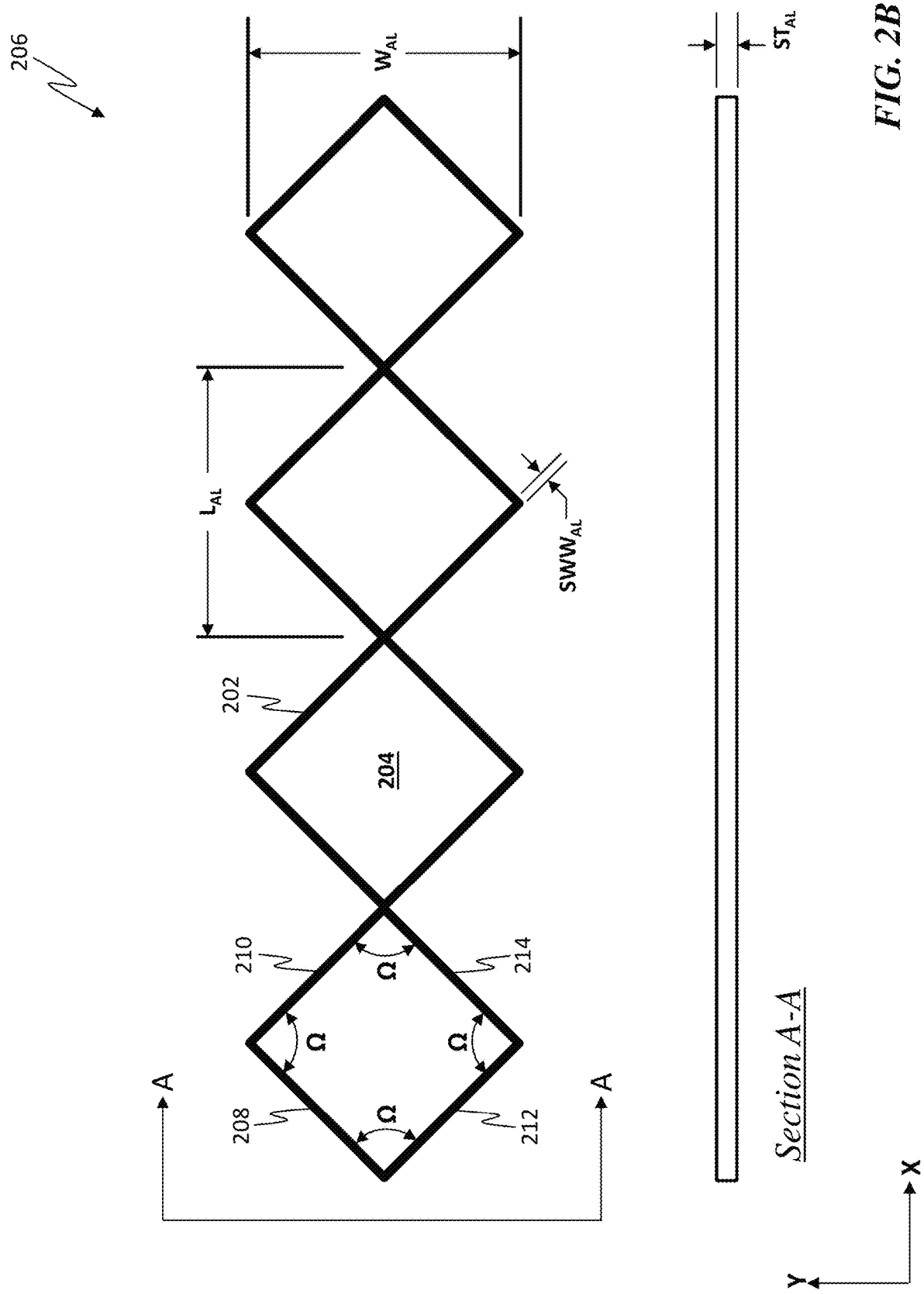
FIG. 2B shows a section of the Conductive Aluminum Lightning Protective Screen of FIG. 2A.

In accordance with one embodiment of the present invention and referring to FIG. 2A, a unique and novel Conductive Aluminum Lightning Protective Screen (CALPS) 200 is shown in accordance with one embodiment and includes a screen structure 202 which defines a plurality of openings 204 that are formed in a diamond shaped pattern having equal interior angles $\Omega$. Referring to FIG. 2B, a portion 206 of the screen structure 202 is shown illustrating one opening 204, wherein the screen structure 202 around the opening 204 includes four (4) sides which define the opening 204. The four (4) sides include a first side 208, a second side 210, a third side 212 and a fourth side 214, wherein the first side 208 is separated from the second side 210 and the third side 212 via angle $\Omega$, and wherein the fourth side 214 is separated from the second side 210 and the third side 212 via angle $\Omega$, wherein angle $\Omega$ is about 90°±2°. As such the angles between all of the adjacent sides are equal.

Moreover, the first side 208, second side 210, third side 212 and fourth side 214 include a sidewall width $SWW_{AL}$ of approximately 0.007±0.002 inches wide and define an opening 204 that includes an opening length $L_{AL}$ and an opening width $W_{AL}$ which are each approximately 0.075±0.006 inches. Additionally, the screen structure 202 has a thickness $ST_{AL}$ of about 0.004±0.002 inches. It should be appreciated that the conductive lightning protective screen 200 may be fabricated, at least in part, from an aluminum alloy material that exhibits a Brinell hardness of about 45, a module of elasticity of about 10,000 psi and an electrical resistivity of about 0.00000290 ohm-cm. One such material is aluminum alloy AL 1145 and may be commercially available from various sources.

Figure 3:
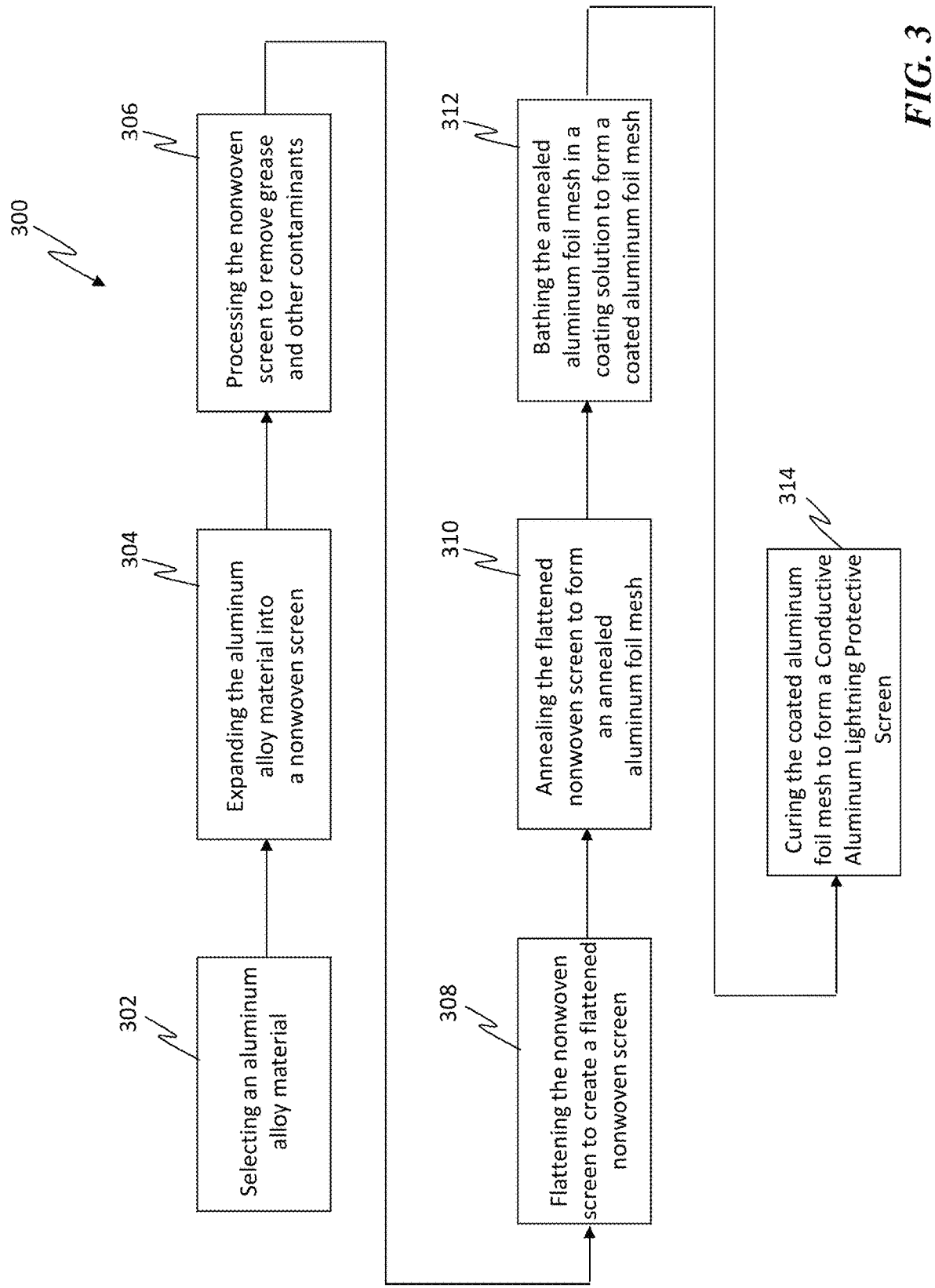
FIG. 3 shows an operational block diagram illustrating a method for fabricating the Conductive Aluminum Lightning Protective Screen of FIG. 2A, in accordance with one embodiment of the invention.

Referring to FIG. 3, an operational block diagram illustrating a method 300 for fabricating the CALPS 200 is shown and includes selecting an aluminum alloy material that exhibits a Brinell hardness of about 45, a module of elasticity of about 10,000 psi and an electrical resistivity of about 0.00000290 ohm-cm, as shown in operational block 302, and expanding the aluminum alloy material into a nonwoven screen having openings 204 that include four (4) equal internal angles $\Omega$, as shown in operational block 304. The nonwoven screen 202 is then subjected to a degreasing process, as shown in operational block 306. This advantageously removes any surface contaminants from the nonwoven screen. It should be appreciated that although any degreasing solvents suitable to the desired end purpose may be used, Bromomethane, also known as methyl bromide, has proven satisfactory for this purpose. The degreased nonwoven screen is flattened to a thickness of between about 0.002 inches and about 0.006 inches to form a flattened nonwoven screen, as shown in operational block 308, wherein the flattened nonwoven screen is annealed to form an aluminum foil mesh, as shown in operational block 310. It should be appreciated that although any annealing process suitable to the desired end purpose may be used, the annealing step may preferably be accomplished at a temperature of approximately 600° F. with an about three hour soak.

The annealed aluminum foil mesh is then controllably passed through a coating solution to create a coated aluminum foil mesh, as shown in operational block 312. In one embodiment, this may be accomplished by controllably bathing the annealed aluminum foil mesh in a coating solution via a coating system as described in U.S. patent application Ser. No. 15/807,109 (the contents of which are incorporated herein by reference). Although any coating method and/or solution suitable to the desired end purpose may be used, one embodiment of the coating solution may be comprised of approximately 5% butyl benzotriazole sodium salt solution that is maintained at a temperature of approximately 78° F., wherein the annealed aluminum foil mesh may be bathed within the conversion coating solution for a period of approximately 30 seconds. The coated aluminum foil mesh may then be cured within a low moisture environment for a time period of approximately 18 hours to form the CALPS 200, as shown in operational block 314.

Figure 4A:
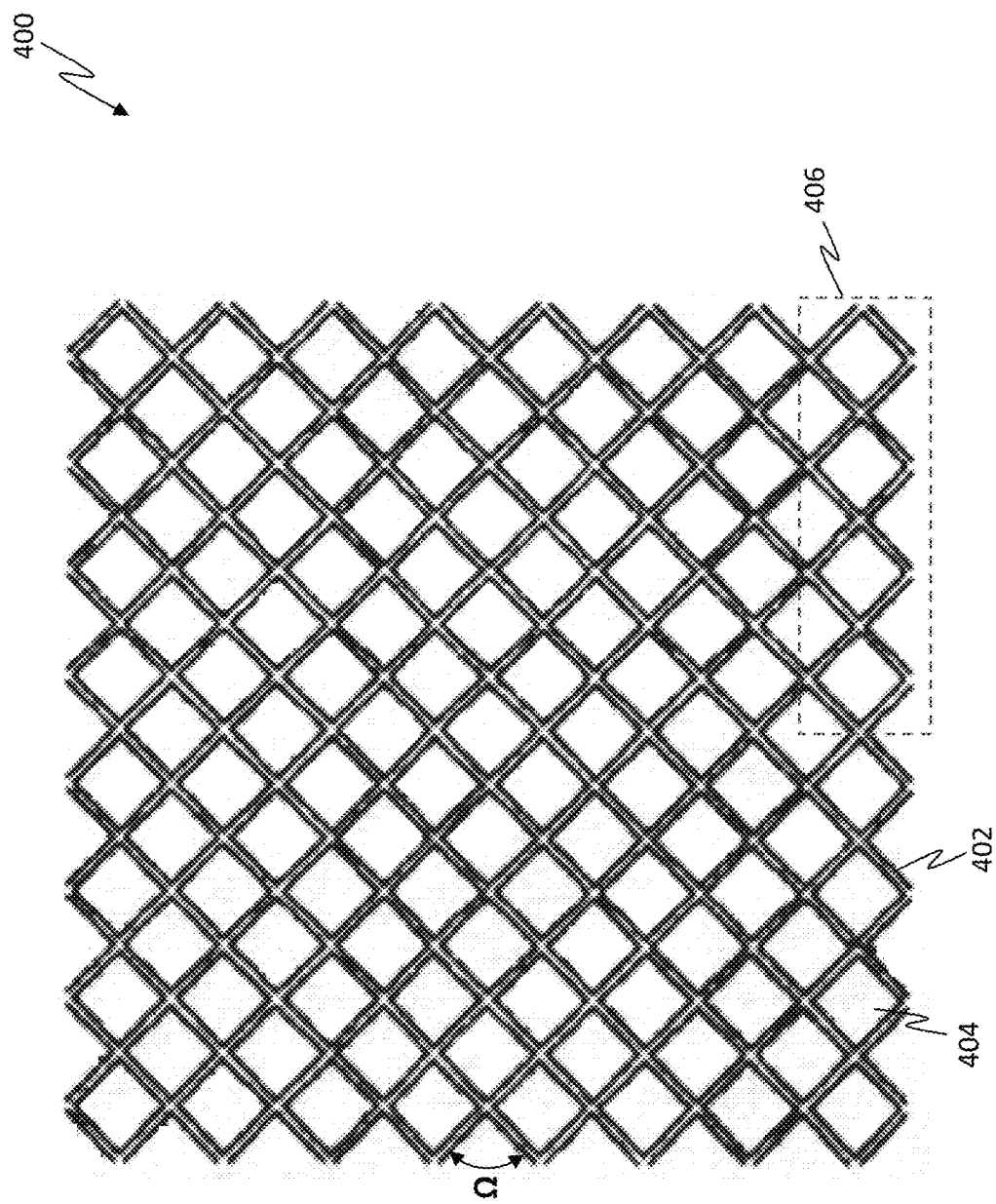
FIG. 4A shows a front view of a Conductive Copper Lightning Protective Screen, in accordance with another embodiment of the invention.

In accordance with another embodiment of the present invention and referring to FIG. 4A, a unique and novel Conductive Copper Lightning Protective Screen (CCLPS) 400 is shown in accordance with another embodiment and includes a screen structure 402 which defines a plurality of openings 404 that are formed in a diamond shaped pattern having equal interior angles $\Omega$. Referring to FIG. 4B, a portion 406 of the screen structure 402 is shown illustrating one opening 404, wherein the screen structure 402 around the opening 404 includes four (4) sides which define the opening 404. The four (4) sides include a first side 408, a second side 410, a third side 412 and a fourth side 414, wherein the first side 408 is separated from the second side 410 and the third side 412 via angle $\Omega$, and wherein the fourth side 414 is separated from the second side 410 and the third side 412 via angle $\Omega$, wherein angle $\Omega$ is about 90°±2°. As such the angles $\Omega$ between all of the adjacent sides are equal.

Moreover, the first side 408, second side 410, third side 412 and fourth side 414 include a sidewall width $SWW_C$ of approximately 0.007±0.002 inches wide and define an opening 404 that includes an opening length $L_C$ and an opening width $W_C$ which are each approximately 0.075±0.006 inches. Additionally, the screen structure 402 has a thickness $ST_C$ of about 0.004±0.002 inches. It should be appreciated that the CCLPS 400 may be fabricated, at least in part, from a copper alloy material that exhibits a Vickers hardness of about 65-95, a module of elasticity of about 17,000 psi and an electrical resistivity of about 10,3 ohm-cmil/ft @about 68° F. One such material is aluminum copper alloy CU ETP 110 and may be commercially available from various sources.

Figure 5:
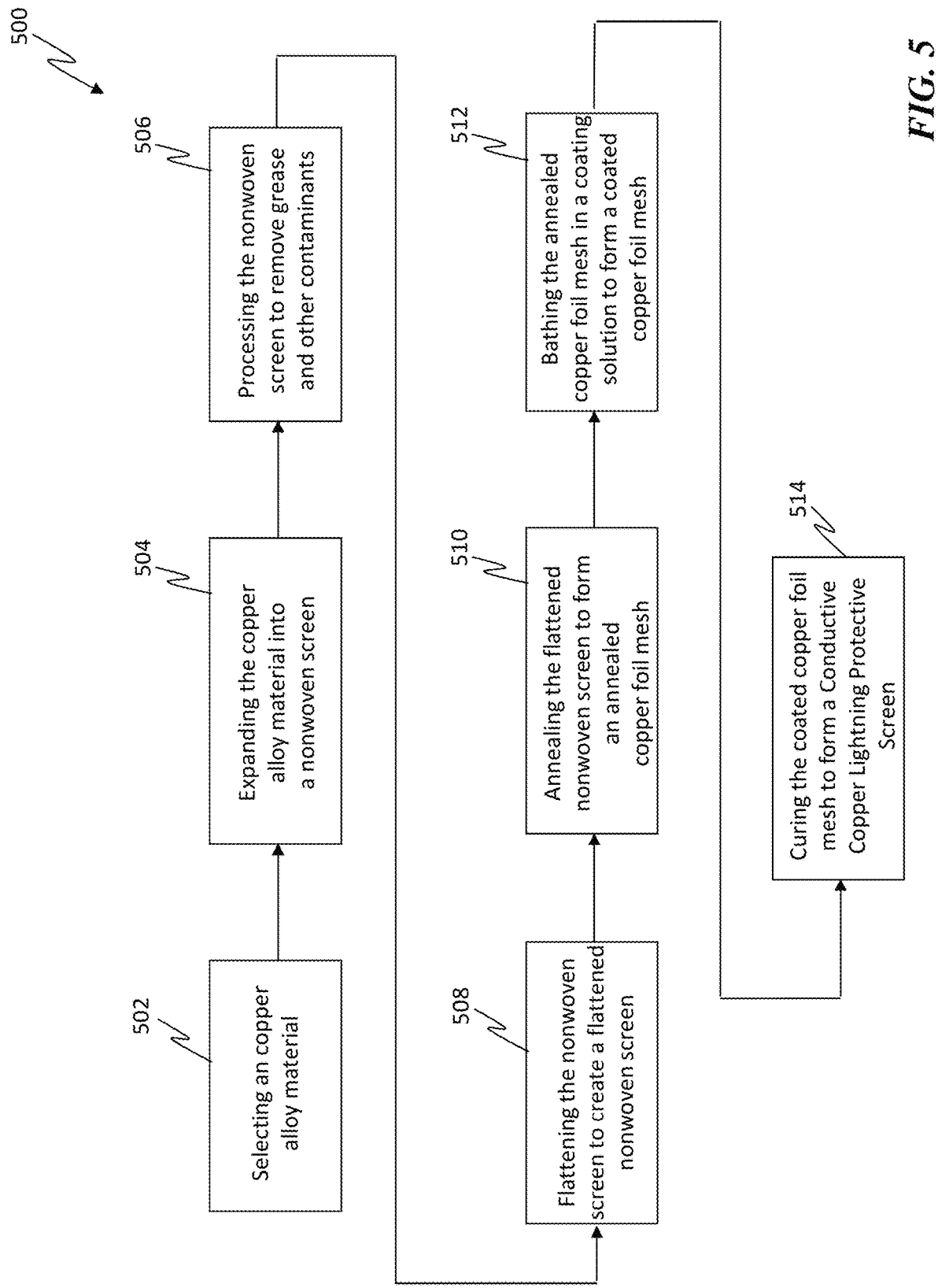
FIG. 5 shows an operational block diagram illustrating a method for fabricating the Conductive Copper Lightning Protective Screen of FIG. 5A, in accordance with another embodiment of the invention.

Referring to FIG. 5, an operational block diagram illustrating a method 500 for fabricating the CCLPS 400 is shown and includes selecting a copper alloy material that exhibits a Vickers hardness of about 65-95, a module of elasticity of about 17,000 psi and an electrical resistivity of about 10,3 ohm-cmil/ft at about 68° F., as shown in operational block 502, and expanding the copper alloy material into a nonwoven screen having openings 404 that include four (4) equal internal angles Ω, as shown in operational block 504. The nonwoven screen 402 is then subjected to a degreasing process, as shown in operational block 506. This advantageously removes any surface contaminants from the nonwoven screen. It should be appreciated that although any degreasing solvents suitable to the desired end purpose may be used, Bromomethane, also known as methyl bromide, has proven satisfactory for this purpose. The degreased nonwoven screen is flattened to a thickness of between about 0.002 inches and about 0.006 inches to form a flattened nonwoven screen, as shown in operational block 508, wherein the flattened nonwoven screen is annealed to form a copper foil mesh, as shown in operational block 510. It should be appreciated that although any annealing process suitable to the desired end purpose may be used, the annealing step may preferably be accomplished at a temperature of approximately 600° F. with an about three hour soak.

The annealed copper foil mesh is then controllably passed through a coating solution to create a coated copper foil mesh, as shown in operational block 512. In one embodiment, this may be accomplished by controllably bathing the annealed copper foil mesh in a coating solution via a coating system as described in U.S. patent application Ser. No. 15/807,109 (the contents of which are incorporated herein by reference). Although any coating method and/or solution suitable to the desired end purpose may be used, one embodiment of the coating solution may be comprised of an approximately 7% ALODINE 5200 solution that is maintained at a temperature of approximately 78° F., wherein the annealed copper foil mesh may be bathed within the conversion coating solution for a period of approximately 30 seconds. The coated aluminum foil mesh may then be cured within a low moisture environment for a time period of approximately 18 hours to form the CCLPS 400, as shown in operational block 514.

It should be appreciated that while the invention disclosed herein is disclosed with reference to specific opening lengths and widths, sidewall widths and material thicknesses, other embodiments may have any sized opening lengths and widths, sidewall widths and/or material thicknesses suitable to the desired end purpose. Additionally, although the invention is disclosed in terms of aluminum alloy and copper alloy, any type of material or combination of materials may be used as desired. Moreover, it is contemplated that in one embodiment, a Conductive Lightning Protective Screen (CLPS) is provided wherein the CLPS includes openings of varying sizes. For example, the CLPS may be fabricated responsive to the topography of the structure to which it is going to be applied and thus, may include opening lengths and widths, sidewall widths and/or material thicknesses of varying sizes. This advantageously allows the CLPS to be fabricated to "direct" the energy of a lightning strike in a desired direction. As such, the CLPS of this embodiment would allow the CLPS to be tailored to the topography of the surface and/or structure to which it is being associated.

In accordance with the present invention, the method 300, 500 of the invention may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the method 300, 500 of the present invention may be embodied in the form of a computer or controller implemented processes. The method 300, 500 of the invention may also be embodied in the form of computer program code containing instructions embfstodied in tangible media, such as floppy diskettes, CD-ROMs, hard drives, Solid State Drives (SSD) and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to a particular embodiment disclosed herein as the best mode contemplated for carrying out this invention, but that the invention will include all embodiments (individually and/or combined) falling within the scope of the appended claims and/or information. Moreover, unless specifically stated any use of the terms first, second, etc. do not denote any order or importance, but rather the terms first, second, etc. are used to distinguish one element from another.

I claim:

1. A Conductive Lightning Protective Screen (CLPS), the CLPS comprising:
   a screen structure,
      wherein the screen structure includes a plurality of openings, wherein each of the plurality of openings are defined by a plurality of sidewalls,
      wherein each of the plurality of openings shares at least one sidewall of the plurality of sidewalls of an adjacent opening,
      wherein each of the plurality of openings having an opening width and an opening length of substantially equal size, wherein each of the plurality of openings include a plurality of substantially equal internal angles, and wherein the CLPS is coated with a conversion coating solution comprised at least partially of at least one of a solution comprising 5% butyl benzotriazole sodium salt and a solution comprising 7% ALODINE 5200.

2. The CLPS of claim 1, wherein the plurality of sidewalls include a first sidewall, a second sidewall, a third sidewall and a fourth sidewall.

3. The CLPS of claim 2, wherein the first sidewall and fourth sidewall are substantially perpendicular to the second sidewall and the third sidewall.

4. The CLPS of claim 1, wherein the CLPS is at least partially constructed from at least one of an aluminum alloy, and a copper alloy.

5. The CLPS of claim 1, wherein the CLPS is at least partially constructed from an aluminum alloy material, wherein the aluminum alloy material exhibits a Brinell hardness of about 45, a module of elasticity of about 10,000 psi and an electrical resistivity of about 0.00000290 ohm-cm.

6. The CLPS of claim 1, wherein the CLPS is at least partially constructed from a copper alloy material, wherein the copper alloy material exhibits a Vickers hardness of about 65-95, a module of elasticity of about 17,000 psi and an electrical resistivity of about 10,3 ohm-cmil/ft @ about 68° F.

7. The CLPS of claim 1, wherein the screen structure includes a structure thickness of between about 0.002 inches and about 0.006 inches.

8. The CLPS of claim 1, wherein each of the plurality of sidewalls includes a sidewall width of between about 0.005 inches and 0.009 inches.

9. A Conductive Lightning Protective Screen (CLPS), the CLPS comprising:

a screen structure having a structure thickness of between about 0.002 inches and about 0.006 inches, wherein the screen structure includes a plurality of openings, wherein each of the plurality of openings are defined by a plurality of sidewalls each having a sidewall width of between about 0.005 inches and 0.009 inches, wherein each of the plurality of openings shares at least one sidewall of the plurality of sidewalls of an adjacent opening, wherein each of the plurality of openings having an opening width and an opening length of substantially equal size, wherein each of the plurality of openings include a plurality of substantially equal internal angles, and wherein the CLPS is coated with a conversion coating solution comprised at least partially of at least one of a solution comprising 5% butyl benzotriazole sodium salt and a solution comprising 7% ALODINE 5200.

10. The CLPS of claim 9, wherein the plurality of sidewalls include a first sidewall, a second sidewall, a third sidewall and a fourth sidewall.

11. The CLPS of claim 10, wherein the first sidewall and fourth sidewall are substantially perpendicular to the second sidewall and the third sidewall.

12. The CLPS of claim 9, wherein the CLPS is at least partially constructed from at least one of an aluminum alloy, and a copper alloy.

13. The CLPS of claim 9, wherein the CLPS is at least partially constructed from an aluminum alloy material, wherein the aluminum alloy material exhibits a Brinell hardness of about 45, a module of elasticity of about 10,000 psi and an electrical resistivity of about 0.00000290 ohm-cm.

14. The CLPS of claim 9, wherein the CLPS is at least partially constructed from a copper alloy material, wherein the copper alloy material exhibits a Vickers hardness of about 65-95, a module of elasticity of about 17,000 psi and an electrical resistivity of about 10,3 ohm-cmil/ft @ about 68° F.

15. The CLPS of claim 9, wherein at least one of, the screen structure includes a screen thickness of about 0.004 inches; and each of the plurality of sidewalls includes a sidewall width of about 0.007 inches and 0.009 inches.

* * * * *